Patented Dec. 1, 1936

2,062,450

UNITED STATES PATENT OFFICE 2,062,450

PROCESS OF PRODUCING FLAVANTHRONE

Fredrick L. English, Carneys Point, N. J., assignor to E. I. du Pont de Nemours & Company, Wilmington, Del., a corporation of Delaware No Drawing. Application February 20, 1934, Serial No. 712,253

11 Claims. (Cl. 260—42)

This invention relates to the production of antimony pentachloride-containing mixtures suitable for condensation purposes. It further relates to the production of flavanthrone.

It is known that antimony trichloride may be reacted with chlorine in the presence of nitrobenzene to produce antimony pentachloride or mixtures of antimony trichloride and antimony pentachloride. According to present commercial processes, the nitrobenzene may be produced by the reaction of benzene with synthetic nitric acid, that is, nitric acid prepared by the usual oxidation of ammonia process. Difficulties have been encountered in the reaction of chlorine with antimony trichloride in the presence of nitrobenzene prepared from synthetic nitric acid. The reaction proceeds comparatively slowly and requires a large excess of chlorine over the theoretical amount which should be necessary to produce the desired degree of chlorination. Furthermore, the reaction is accompanied by side reactions, particularly chlorination of the nitrobenzene.

One of the chief uses of antimony pentachloride and mixtures thereof with antimony trichloride is in the formation of the dye Ponsol yellow G (Color Index No. 1118), which is known technically as flavanthrone. The formation of flavanthrone is ordinarily effected by the condensation of beta-amino-anthraquinone with antimony pentachloride in nitrobenzene. It has been found that when antimony pentachloride is produced by the reaction of chlorine with antimony trichloride in the presence of nitrobenzene prepared from synthetic nitric acid, not only is there difficulty in preparing the antimony pentachloride but the antimony chloride-nitrobenzene mixture obtained, when used in the production of flavanthrone, is unsatisfactory on account of the low yields.

It is an object of the present invention to provide a new and improved process of producing antimony pentachloride-containing mixtures suitable for the condensation of beta-amino-anthraquinone to flavanthrone. Another object is the provision of a new and improved process for the production of flavanthrone. Other objects will appear hereinafter.

These objects are accomplished by (1) forming antimony pentachloride in a solvent mixture with the addition of iodine, and (2) reacting the resultant mixture with beta-amino-anthraquinone to produce flavanthrone.

The formation of the antimony pentachloride-containing solvent mixture may be effected in several ways. One method is to start with the antimony trichloride in a solvent such as nitrobenzene and react chlorine therewith. The presence of iodine greatly influences this reaction. For instance, I have found that when antimony trichloride in nitrobenzene prepared from synthetic nitric acid is reacted with chlorine, with the addition of a small amount of free iodine, about 20 to 30% less chlorine is required to produce an antimony pentachloride-containing mixture suitable for the flavanthrone condensation than in the case where no iodine is added. Furthermore, the yields of flavanthrone may be increased as much as 7 to 12% by the use of the antimony pentachloride-containing mixture prepared by reacting chlorine upon antimony trichloride with the addition of iodine, in nitrobenzene made from synthetic nitric acid, as compared with the use of a similar chlorination mixture to which no iodine was added.

As an alternative method of producing the antimony pentachloride-containing solvent mixture, I have found that it is possible to chlorinate finely divided metallic antimony suspended in nitrobenzene. The chlorination may be carried directly through the antimony trichloride stage until the product is substantially a solvent mixture of antimony pentachloride or of antimony pentachloride and antimony trichloride. It will be recognized that the presence of iodine is advantageous when the process is carried out in this manner, for the same reasons indicated above.

The invention will be further understood, but is not limited, by the following examples, in which the parts are by weight.

Example I

To 2900 parts of nitrobenzene produced by the reaction of benzene with a synthetic nitric acid were added 620 parts of antimony trichloride and 0.12 part of iodine. Chlorine was introduced into this liquid until the mixture showed an increase in weight of 165 parts. This chlorination was carried out at a temperature of 10° C. to 40° C., cooling being necessary to keep the temperature within these limits.

To this condensation mixture, consisting mainly of nitrobenzene and antimony pentachloride with a small amount of antimony trichloride, were added 200 parts of beta-amino-anthraquinone. The flavanthrone condensation was carried out at about 200° C. to 220° C. At the end of the heating period, the charge was cooled and filtered.

The flavanthrone may be recovered by drying directly in vacuum or the solvent may be removed by steam-distillation, or the nitrobenzene may be removed by washing with alcohol.

Example II

The dark, tarry filtrate recovered from a previous flavanthrone condensation, as described in Example I, was subjected to a distillation under vacuum and a mixture of nitrobenzene and antimony trichloride obtained, leaving the tarry residue in the still.

To approximately 2700 parts of distilled nitrobenzene-antimony trichloride mixture was added sufficient fresh nitrobenzene and antimony trichloride to increase the amount of the latter to 22.6%, or an equivalent of 615 parts of antimony trichloride in the mixture. Chlorine was then introduced into the liquid until the mixture had shown an increase in weight of 165 parts. The chlorination was carried out at a temperature of about 10° C. to about 40° C.

To the resultant chlorination mixture was then added 200 parts of beta-amino-anthraquinone. The condensation was carried out as described in Example I.

It will be noted that no fresh iodine was added either in the chlorination or the condensation. The recovery of the nitrobenzene and antimony trichloride was carried out as before and the recovered solvent mixture employed in subsequent condensations. Fresh iodine was added after the fourth recovery of the solvent mixture.

Example III

To a mixture of 2100 parts of nitrobenzene, prepared by the nitration of benzene with synthetic nitric acid, and 615 parts of antimony trichloride was added 0.175 part of potassium iodide. The charge was chlorinated at 10° C. to 40° C. until 165 parts of chlorine had been absorbed, as shown by the increase in weight and the amount of antimony trichloride present in the mixture. The condensation of beta-amino-anthraquinone to flavanthrone was carried out as described in Example I. A good yield of flavanthrone was obtained.

Example IV

Two hundred forty-seven (247) parts of metallic antimony of sufficient fineness to pass through a 200-mesh screen were suspended in 1537 parts of nitrobenzene prepared by the nitration of benzene with synthetic nitric acid such as obtainable by the oxidation of ammonia. One-tenth part of iodine was added to the suspension. Then 350 parts of chlorine were added slowly at a temperature of about 15° C. to 35° C.

To the resultant reaction mixture, composed largely of antimony pentachloride and nitrobenzene, but containing some antimony trichloride, 150 parts of beta-amino-anthraquinone were added with continued agitation. The flavanthrone condensation was carried out at 200° C. to 220° C. At the end of the heating period the charge was cooled and filtered.

The chlorination of metallic antimony proceeded smoothly and easily, without the dangers encountered in certain other processes of producing antimony chlorides. Moreover, the reaction mixture was relatively non-corrosive and could readily be handled in iron materials of construction. The chlorination reaction also apparently proceeded with little or no chlorination of the nitrobenzene, the final solution of antimony pentachloride being but little darker than when antimony trichloride was chlorinated.

The amount of iodine which gives a maximum yield of color is about 0.005%, based on the weight of nitrobenzene used. Percentages higher than this cause a slowly decreasing yield of color, although the efficiency of the chlorination remains practically constant. When the amount of iodine present is about 0.5%, the yield of color drops to 19%. The lower limit of the amount of iodine is preferably about 0.0001%, based on the nitrobenzene.

As indicated by Example III, inorganic iodine compounds may be substituted for free iodine in chemical equivalent amounts. Insofar as is known, inorganic iodine compounds are all satisfactory, probably due to the ease with which they are broken down by chlorine into elemental iodine. Further examples of inorganic iodine compounds which may be employed are sodium iodide, barium iodide, calcium iodide, magnesium iodide, and the corresponding iodates. Similarly, organic iodine compounds such as, for example, iodobenzene, meta-iodonitrobenzene and paraiodonitrobenzene may be employed.

The amount of nitrobenzene used may be varied within relatively wide limits. Good results have been obtained in the use of about 300 to about 500 parts of nitrobenzene for every 100 parts of antimony trichloride. If metallic antimony is used as a raw material, a weight ratio of nitrobenzene to metallic antimony varying within the range of about 2:1 to about 10:1 normally gives satisfactory results. The state of subdivision of the metallic antimony may vary widely but, in general, the more finely ground metal, preferably 100 to 200-mesh fineness, chlorinates more readily than that in a coarser state of division. Other aromatic solvents such as, for example, ortho-nitrochlorobenzene, and para-nitrochlorobenzene may be used instead of or in admixture with nitrobenzene, but the results are less desirable. Similarly, substantially inert aromatic solvents of the naphthalene and anthracene series may be employed.

The time of the chlorination and of the flavanthrone condensation may be varied between wide limits without affecting the yield of the product substantially.

The temperature of the chlorination and flavanthrone condensation is subject to variation. Ordinarily, the chlorination is effected with good results at relatively low temperatures, preferably not higher than about 40° C. The condensation may be effected at 200° C. to 225° C. If desired the whole condensation reaction may be carried out under reflux at atmospheric pressure. Closed vessels and super-atmospheric pressures may likewise be used.

While the invention is not limited by any theory, it appears that iodine has a catalytic effect in the chlorination of antimony trichloride to antimony pentachloride. In the absence of iodine, the excessive amount of chlorine used to produce the pentachloride seems to form by-products detrimental to the flavanthrone condensation, thereby diminishing the yields. In any event, it is apparent that the combination of steps, viz., the chlorination and the condensation, are integrally related.

Some of the advantages of the chlorination step are the saving of chlorine, the production of antimony pentachloride in a relatively high state of purity, the provision of a method of producing antimony pentachloride by starting with a basic raw material, metallic antimony, and avoiding the expensive intermediate step of isolating antimony trichloride, and the provision of a chlorination process which is not detrimentally affected by the presence of small amounts of sulfur or iron.

The benefits in the production of flavanthrone are evident in the high yields obtainable and the purity of the product. It naturally follows that the process is advantageous from the economic point of view.

The expression "synthetic nitric acid" is employed throughout the specification and claims to cover nitric acid prepared by the ammonia oxidation process.

As many apparently widely different embodiments of this invention may be made without departing from the spirit and scope thereof, it is to be understood that I do not limit myself to the specific embodiments thereof except as defined in the following claims.

I claim:

1. The process which comprises forming antimony pentachloride in the presence of an inert organic solvent with the addition of an iodine catalyst, and reacting the resultant antimony pentachloride-containing solvent mixture with beta-amino-anthraquinone to form flavanthrone.

2. The process which comprises reacting chlorine upon a substance selected from the group consisting of metallic antimony and antimony trichloride with the addition of iodine in nitrobenzene to form an antimony pentachloride-containing solvent mixture, and condensing said mixture with beta-amino-anthraquinone to produce flavanthrone.

3. The process which comprises reacting chlorine upon a substance selected from the group consisting of metallic antimony and antimony trichloride with the addition of iodine in nitrobenzene prepared from synthetic nitric acid to form an antimony pentachloride-containing solvent mixture, and condensing said mixture with beta-amino-anthraquinone to produce flavanthrone.

4. The process which comprises reacting antimony trichloride with chlorine in an inert organic solvent with the addition of an iodine catalyst.

5. The process which comprises reacting antimony trichloride with chlorine in the presence of nitrobenzene prepared from synthetic nitric acid, and an iodine catalyst.

6. The process of claim 5 in which the iodine catalyst is introduced into the reaction zone in the form of a substance selected from the group consisting of iodine and iodine compounds from which iodine is liberated by chlorine.

7. The process of claim 3 in which the antimony chloride-nitrobenzene mixture is distilled from the condensation product, and the distillate further chlorinated and employed in subsequent condensations.

8. The process which comprises reacting antimony trichloride with chlorine in the presence of iodine and nitrobenzene prepared from synthetic nitric acid, and condensing the chlorination mixture comprising substantially nitrobenzene and antimony pentachloride, together with some antimony trichloride and iodine, with beta-amino-anthraquinone, the amount of iodine present during the chlorination and condensation being about 0.0001 to about 0.5% based on the weight of the nitrobenzene.

9. The process which comprises chlorinating antimony trichloride in the presence of iodine and nitrobenzene, and condensing the reaction product with beta-amino-anthraquinone, the amount of iodine present during the chlorination and condensation being about 0.005%, based on the weight of nitrobenzene.

10. The process which comprises reacting antimony trichloride with chlorine in the presence of iodine and nitrobenzene prepared from synthetic nitric acid, and condensing the chlorination mixture comprising substantially nitrobenzene and antimony pentachloride, together with some antimony trichloride and iodine, with beta-amino-anthraquinone, the amount of iodine present during the chlorination and condensation being about 0.005%, based on the weight of nitrobenzene.

11. The process which comprises introducing about 165 parts of chlorine into a mixture of about 2900 parts of nitrobenzene prepared from synthetic nitric acid, about 620 parts of antimony trichloride and about 0.12 part of iodine while maintaining a temperature of about 10° C. to about 40° C., then adding about 200 parts of beta-amino-anthraquinone to this chlorination mixture, heating to and maintaining a temperature of about 200° C. to about 225° C., then cooling, and separating the flavanthrone.

FREDRICK L. ENGLISH.